US005500640A

United States Patent [19]

Zhou et al.

[11] Patent Number: 5,500,640

[45] Date of Patent: Mar. 19, 1996

[54] METHOD AND APPARATUS FOR AUTOMATICALLY DESENSITIZING SENSOR ELEMENTS OF PROTECTED ARTICLES

[75] Inventors: Peter Y. Zhou, Smithtown; Christopher R. Paul, Bayport; Dexing Pang, Hauppauge, all of N.Y.

[73] Assignee: Knogo North America Inc., Hauppauge, N.Y.

[21] Appl. No.: 429,229

[22] Filed: Apr. 25, 1995

Related U.S. Application Data

[63] Continuation of Ser. No. 145,645, Nov. 4, 1993, abandoned.

[51] Int. Cl.[6] .......... G06F 7/08

[52] U.S. Cl. .......... 340/572; 340/551; 235/384; 235/400

[58] Field of Search .......... 340/572, 551; 364/419.17; 335/284; 235/384, 400, 499, 500

[56] References Cited

U.S. PATENT DOCUMENTS

| | | | |
|---|---|---|---|
| 4,141,078 | 2/1979 | Bridges, Jr. et al. | 364/900 |
| 4,623,877 | 11/1986 | Buckens | 340/572 |
| 4,881,061 | 11/1989 | Chambers | 340/568 |
| 5,146,204 | 9/1992 | Zhou et al. | 340/551 |
| 5,187,354 | 2/1993 | Bengtsson | 335/284 |
| 5,225,807 | 7/1993 | Zhou | 335/284 |
| 5,260,690 | 11/1993 | Mann | 340/551 |
| 5,288,980 | 2/1994 | Patel | 340/572 |

*Primary Examiner*—John K. Peng
*Assistant Examiner*—Albert K. Wong
*Attorney, Agent, or Firm*—Fitzpatrick, Cella, Harper & Scinto

[57] ABSTRACT

A desensitizer apparatus for desensitizing a security sensor element in a book spine. The apparatus includes a scanner which scans along a surface against which book spines are positioned and which detects sensor elements in the spines to be sure that only one book is positioned against the surface. If only one sensor element is detected, a signal is generated which operates a drive mechanism to move desensitizer magnets close to the surface to deactivate the sensor element in the book.

22 Claims, 8 Drawing Sheets

METHOD AND APPARATUS FOR AUTOMATICALLY DESENSITIZING SENSOR ELEMENTS OF PROTECTED ARTICLES

This application is a continuation of patent application Ser. No. 08/145,645 filed Nov. 4, 1993, abandoned.

BACKGROUND OF THE INVENTION

1. Field of the Invention

This invention relates to the desensitizing of theft detection sensor elements of protected articles, for example, sensor elements in the spines of books and more particularly it concerns novel methods and apparatus for automatically desensitizing sensor elements when the articles on which they are mounted have been authorized for release from a protected area such as a library.

2. Description of the Related Art

In an effort to save on personnel costs in libraries, various library services have been automated. One such automated service is that of automatic book checkout. Examples of automatic book checkout machines are shown and described in U.S. Pat. Nos. 4,141,078 and 4,881,061. These devices comprise optical sensors which read an identifying code, such as a bar code, on a book to be checked out as well as an identifying code on the library card of a patron checking out the book. After these codes have been read, the device operates a sensor deactivator which deactivates a theft detection sensor on the book. At this point the book may be removed from the device and taken out of the library without triggering an alarm.

A problem encountered in connection with these automatic book checkout devices is that the patron may place several books in the device at the same time. The device will read only the bar code of the topmost book; but when the desensitizer is actuated, it will desensitize all the books in the checkout device. To overcome this problem U.S. Pat. No. 4,141,078 proposes to provide a slanted shelf on which to lay the book for checkout. If two or more books are placed on the shelf, the upper book or books will slide off from the lower one and cause a photoelectric sensor to indicate an improper use of the machine. U.S. Pat. No. 4,881,061 proposes an alternate multiple book sensing technique, namely to measure the thickness of the book using an ultrasonic ranging device. This thickness is compared with the thickness identified by the identifying code on the book; and if the two do not correspond, the desensitizer apparatus is not activated. U.S. Pat. No. 4,881,061 also suggests the possibility of measuring the weight rather than the thickness of the book.

Each of these techniques has inherent disadvantages. Specifically, where a slanted shelf is used, the system must depend on the frictional characteristics of the covers of the books and they must incorporate a complicated system of photoelectric sensors. Also, where the thickness or weight of the book is read from its identifying label, each book's identifying label must be specially coded with the book's thickness or weight. This imposes a substantial burden of special coding individual books, particularly where a large number of books is to be maintained in the library.

SUMMARY OF THE INVENTION

The present invention permits sensor elements on books or other articles to be desensitized one at a time and it prevents simultaneous desensitizing of the sensor elements on several books or other articles without measuring any characteristic of the books or articles such as thickness or weight.

According to one aspect of the present invention there is provided a novel apparatus for desensitizing sensor elements which are mounted in protected articles such as in the spines of books and for ensuring that only a predetermined number of sensor elements, for example, one, is desensitized at a time. This novel apparatus includes a scanner arranged to scan along a surface against which the spines of books or other articles carrying sensor elements are placed, and to detect the presence of sensor elements. The apparatus also includes a sensor element desensitizing mechanism and a control apparatus which is arranged to operate the desensitizing mechanism when and only when the scanner has detected the presence of a predetermined number, for example, one, of the sensor elements in one scan.

According another aspect of the invention, there is provided a novel method for desensitizing sensor elements which are mounted in protected articles such as in the spines of books and for ensuring that only a predetermined number, for example, one, of the sensor elements is desensitized at a time. This novel method includes the steps of scanning along a surface against which the books or other protected articles are placed; and detecting the presence of the sensor elements during the scanning. The method also includes the step of desensitizing the sensor elements on the books or other protected articles in response to the detection of only a predetermined number, such as one, of the sensor elements has been detected in one scan.

DETAILED DESCRIPTION OF THE PREFERRED EMBODIMENT

Figure 1:
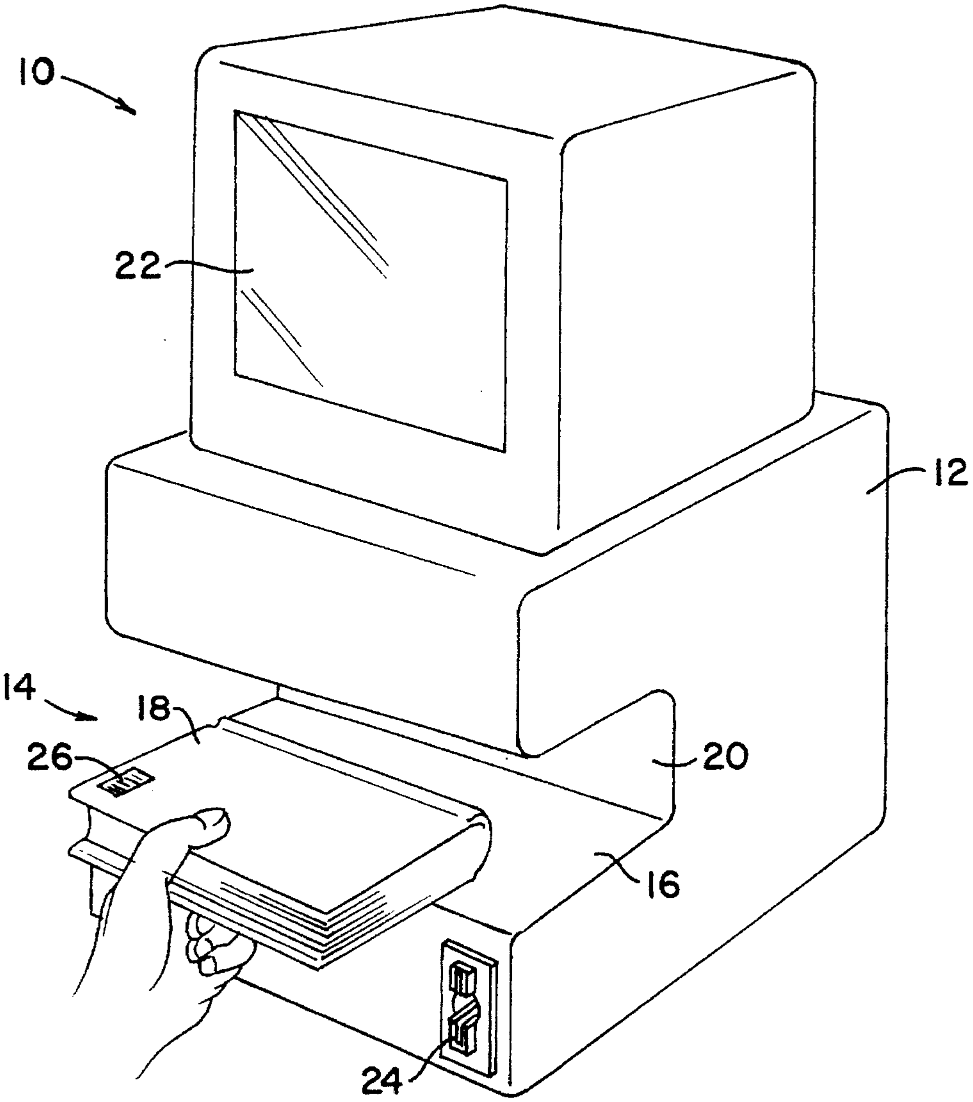
FIG. 1 is a perspective view of an automatic book checkout device in which the desensitizer of the present invention can be used.

An automatic book checkout apparatus 10 as shown in FIG. 1 may be used for self checkout of books by patrons at libraries. The automatic checkout apparatus comprises a main housing 12 formed with a front recess 14 open at the front and sides and into which a book to be checked out can be placed. The recess 14 is defined in part by a horizontal shelf 16 on which a book 18 may be placed, and a vertical back wall 20 against which the spine of the book is positioned. The checkout apparatus also includes a monitor 22 which provides instructions and verification to the patron. A slot 24 is also provided at the front of the device for the patron to insert his or her library card.

The apparatus includes an optical sensor (not shown) which reads an identification symbol 26, such as a bar code on the cover of the book 18, and a processor (also not shown) which correlates information regarding the library card identification and the book identification and enters information regarding the checkout of the book in the library records. The apparatus may also provide a paper record for the patron which indicates when the book must be returned.

The apparatus as thus far described is not part of the invention and is mentioned only to provide background.

Figure 3:
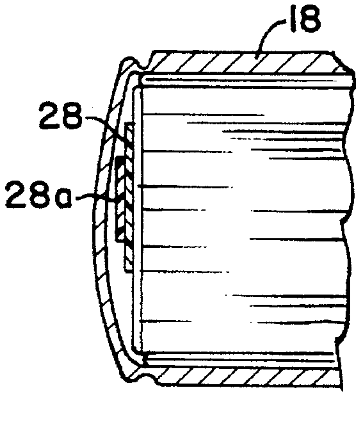
FIG. 3 is an enlarged view taken along line 3—3 of FIG. 2.
Figure 2:
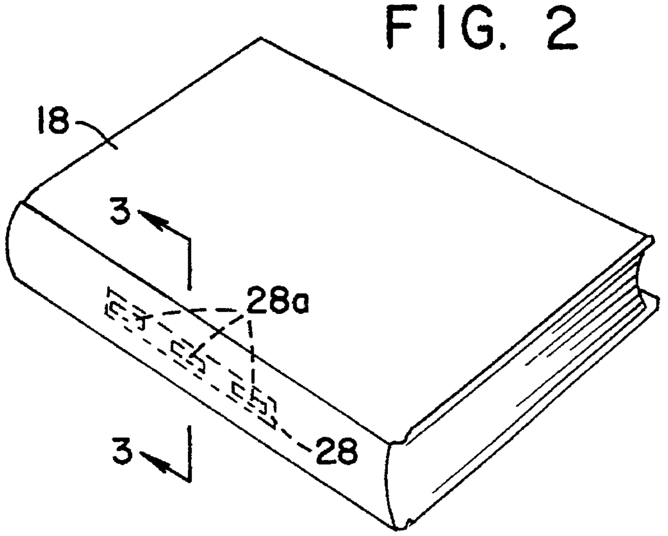
FIG. 2 is a perspective view of a book with a sensor element in its spine.

As shown in FIGS. 2 and 3, a sensor element 28 is inserted in the spine 30 of the book 18. This sensor element is a thin strip of high magnetic permeability material such as Permalloy®, or an amorphous alloy such as Metglas®, which is capable of being driven alternately into and out of magnetic saturation in the presence of alternating magnetic interrogation fields. When a book with such a sensor element is carried through the library exit, it encounters an alternating magnetic interrogation field being generated by a theft detection apparatus (not shown) at the exit. The sensor element 28 in the book 18 becomes driven into and out of magnetic saturation by the alternating magnetic field and thereby produces distinctive disturbances of the field. These disturbances are detected by a receiver which is also positioned at the library exit; and the receiver produces an alarm.

The sensor element 28 is also provided with magnetic desensitizing elements 28*a* of hard magnetic material; and when these elements are magnetized, they prevent the sensor element from disturbing the alternating magnetic interrogation field. In this manner, the book 18 is desensitized or authorized and the patron may then take it out of the library without causing an alarm to be produced. Detecting and desensitizing apparatus as described above are shown and described in detail in U.S. Pat. Nos. 4,623,877 and 5,146,204.

A desensitizing apparatus for applying a strong magnetic field to magnetized elements 28*a* on the sensor elements 28 and thereby desensitize them, is located behind the vertical back wall 20 of the apparatus 10. As can be seen in FIG. 1, the height of the recess 14 into which the book 18 is placed must be sufficiently large to accommodate the thickest possible book. A problem arises however, because this also makes it possible for the patron to place several thinner books in the recess 14, whereupon the optical scanner will read and record only the identification symbol 26 on the uppermost book while the deactivator will deactivate the sensors in all the books in the recess. This problem is avoided in a novel manner with the present invention, an illustrative example of which is shown in FIGS. 4–9.

Figure 4:
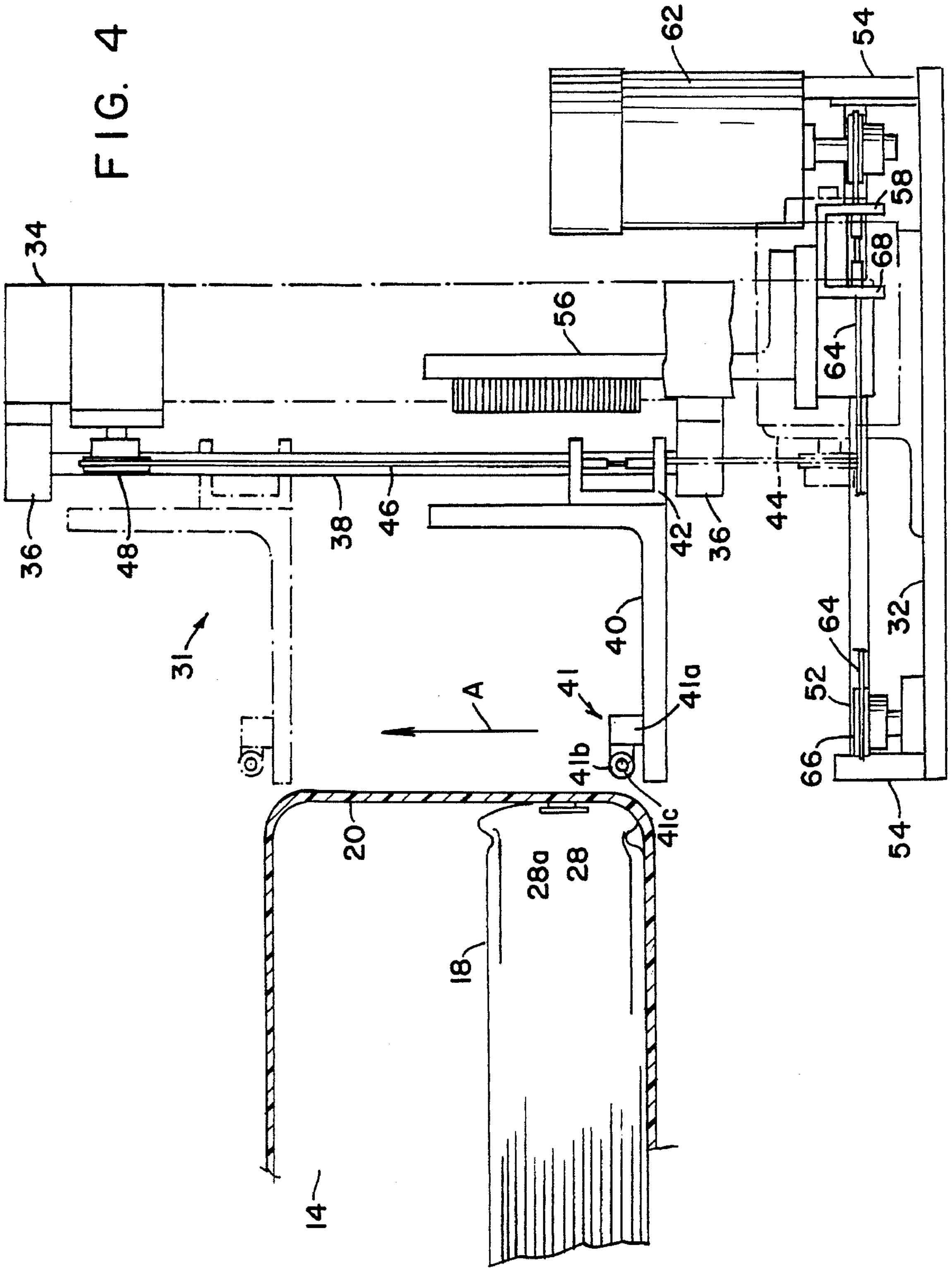
FIG. 4 is a side elevational view, partially cut away, of a desensitizer according to the present invention, which may be used in the book checkout apparatus of FIG. 1; the desensitizer being shown in a scanning operation.
Figure 6:
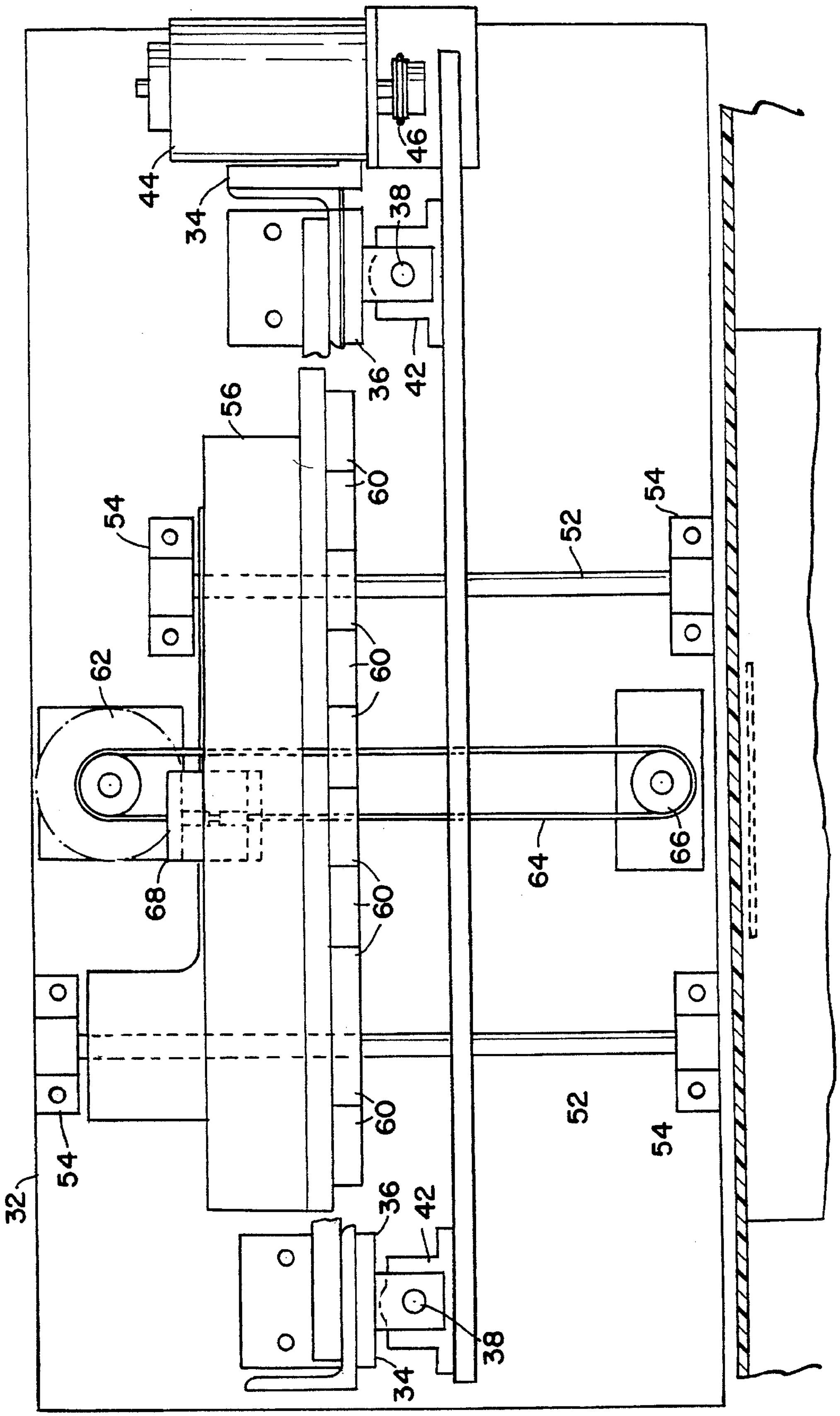
FIG. 6 is a view taken along line 6—6 of FIG. 4.

As shown in FIGS. 4 and 6. a desensitizer assembly 31 according to the present invention includes a horizontal base plate 32 on which are mounted a pair of spaced apart scanner support columns 34. A horizontal upper brace 35, shown in FIG. 8, extends between the upper ends of the support columns 34. Upper and lower scanner rail supports 36 are mounted to extend out from the front of the upper and lower ends, respectively, of each column 34. Cylindrical rails 38 extend vertically between the upper and lower rail supports 36 in front of the support columns 34. A scanner carrier 40 extends horizontally in front of the support columns 34. The carrier has flanged brackets 42 extending from the rear thereof; and each bracket encircles and slides along one of the rails 38.

Figure 8:
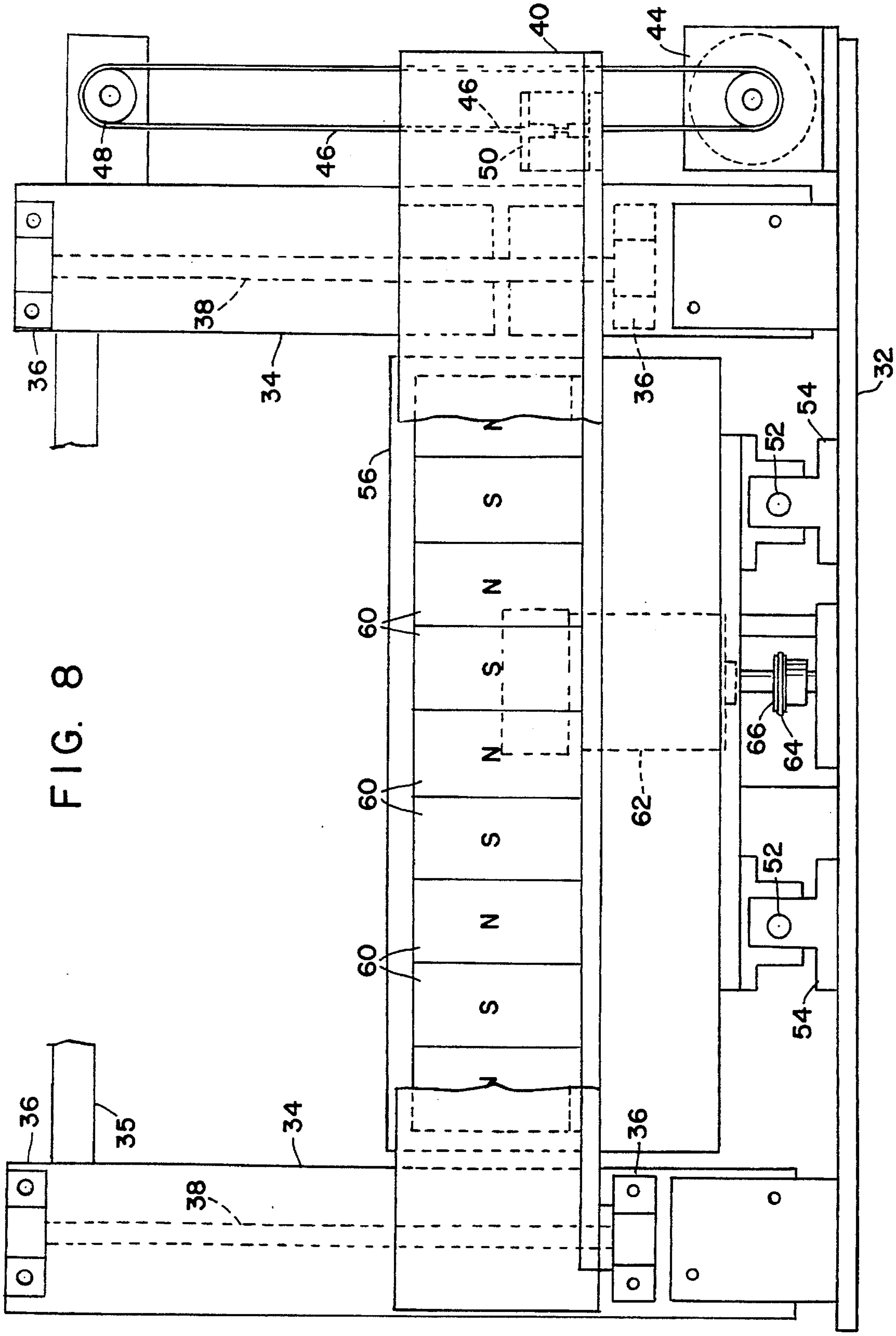
FIG. 8 is a view taken along line 8—8 of FIG. 7.

A scanner drive motor 44 is mounted on the base plate 32 next to one of the vertical support columns 34. As can be seen in FIG. 8, the motor 44 drives a vertical chain belt 46 which is supported at its upper end by an upper sprocket 48 mounted at the upper end of the support column 34. The belt 46 is attached to an anchor 50 on the scanner carrier 40. Thus as the scanner drive motor 44 turns in one direction it drives the scanner carrier upwardly along the rails 38; and as it turns in the opposite direction, it drives the scanner carrier downwardly along the rails, as illustrated by the arrow A in FIG. 4.

Figure 5:
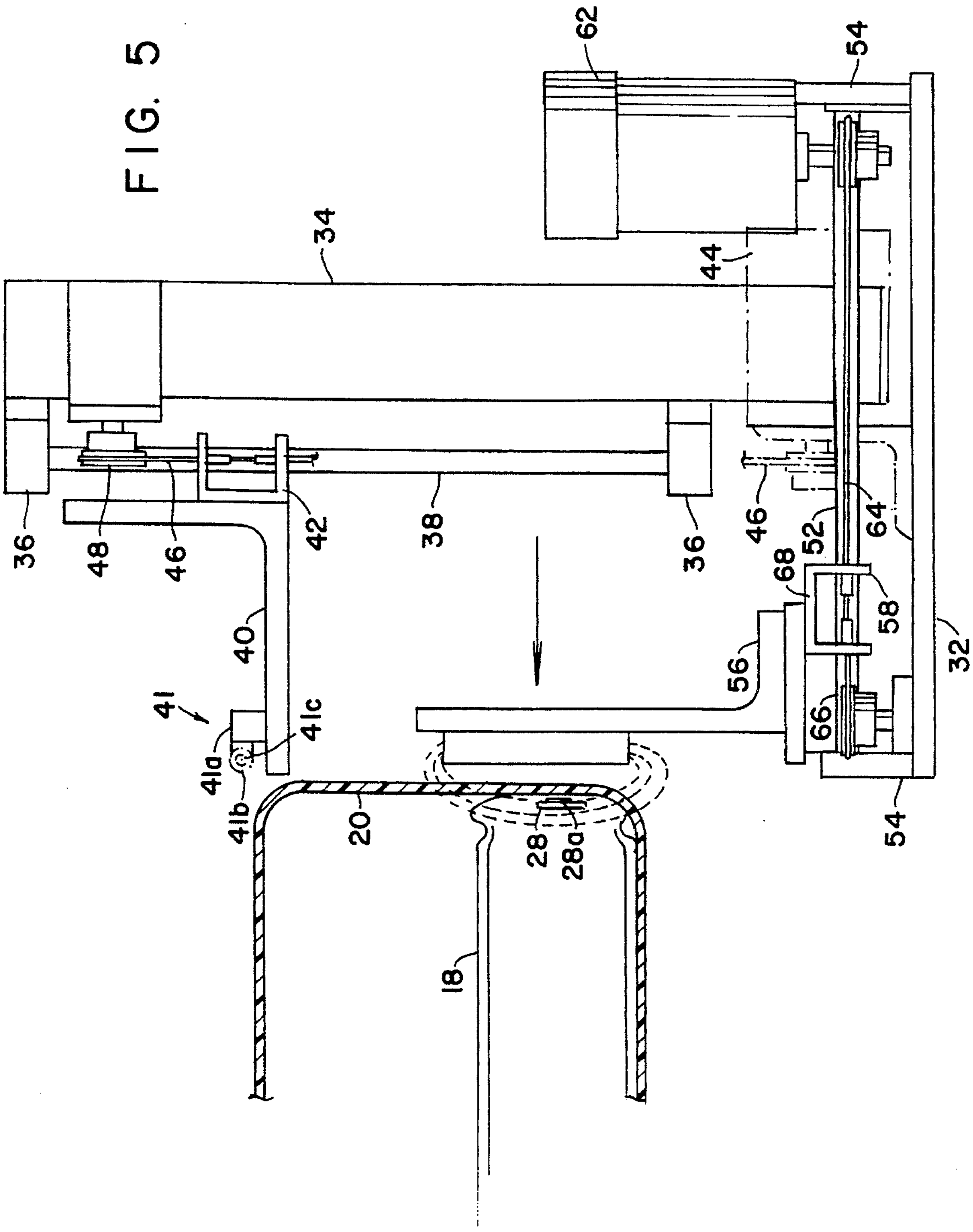
FIG. 5 is a view similar to FIG. 4 but showing the desensitizer in a desensitizing operation.

As shown in FIGS. 4 and 5, a scanner 41 is mounted on the carrier 40 next to the wall 20. The scanner comprises an oscillator 41a and a coil 41*b* connected in its tank circuit. The coil has a ferrite rod 41*c* extending through it; and the coil and rod extend horizontally along the length of the carrier 40, that is, parallel to and adjacent the wall 20 and along a direction transverse to the direction of movement of the carrier 40, that is transverse to the direction of scan.

Figure 7:
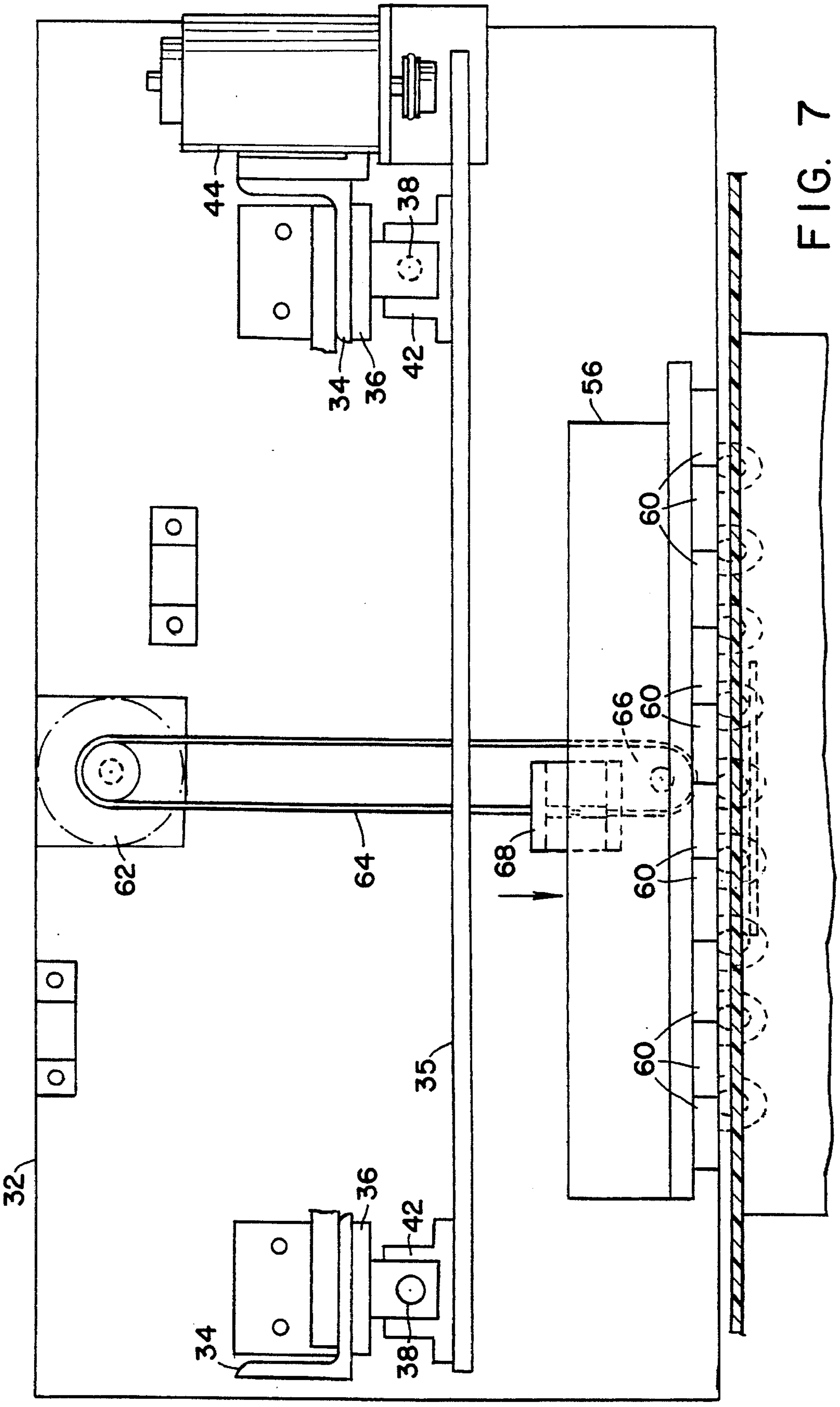
FIG. 7 is a view taken along line 7—7 of FIG. 5.

As can be seen in FIG. 6, there are provided a pair of spaced apart parallel horizontally extending desensitizer guide rails 52 which extend from near the rear to the front of the base plate 32. As shown in FIGS. 6 and 8, the rails 52 are supported a short distance above the base plate by front and rear desensitizer rail supports 54. As also shown in FIG. 8, a horizontally extending desensitizer support bracket 56 rests on slides 58 which ride forwardly and rearwardly along the desensitizer guide rails 52. As can be seen in FIGS. 7 and 8, a series of permanent magnet desensitizers 60 are mounted on the front of the desensitizer support bracket 56.

In FIGS. 6 and 7 there is shown a desensitizer drive motor 62 is mounted along the rear edge of the base plate 32. This motor drives a chain belt 64 which extends around a forward sprocket 66 at the front edge of the base plate. The chain belt 64 is connected to a desensitizer anchor 68 on the desensitizer support bracket 56. Thus as the motor 62 turns in one direction, it moves the bracket 56 and the desensitizers 60 forwardly; and as it turns in the opposite direction, it moves the bracket and desensitizers rearwardly, as shown by the arrow B.

Operation of the above described desensitizer assembly begins with a start signal which is generated by a switch (not shown) after a book 18 is placed in the recess 14 and after a patron has inserted his or her library card into the slot 24. The start signal causes the scanner 41, which is normally in its uppermost position, as shown in solid outline in FIG. 4, to be driven by the drive motor 44 to its lowermost position, as shown in solid outline position in FIG. 5. The motor then reverses to drive the scanner 41 back to its uppermost position. During this upward movement, signals are generated as the scanner 41 passes by a sensor element 28 on the book 18. This signal is generated because the material of the sensor element 28 reacts with the oscillator coil to shift the resonance frequency of the tank circuit of the oscillator. This causes the oscillator's amplitude to dip as the scanner coil passes by the sensor element 28. If two or more books with sensor elements in their spines are present in the recess 14, a corresponding number of signals in the form of oscillator amplitude dips will be generated during the upward scan. However, if only one signal is generated, the apparatus will continue operation by causing the desensitizer magnets 60 to be driven forwardly toward the wall 20 where the book or books 18 are located. When the desensitizer magnets 60 are near the wall, the magnetic fields which they generate cause the desensitizer elements 28*a* on the sensor strip 28 to become magnetized and thereby desensitize the strip. The desensitizer magnets 60 are then driven back to their original position; and the book 18, with its sensor strip 18 now desensitized, may be removed from the recess 14. The book 18 may then be taken through the interrogation field which is generated at the library exit without causing an alarm to be produced.

Figure 9:
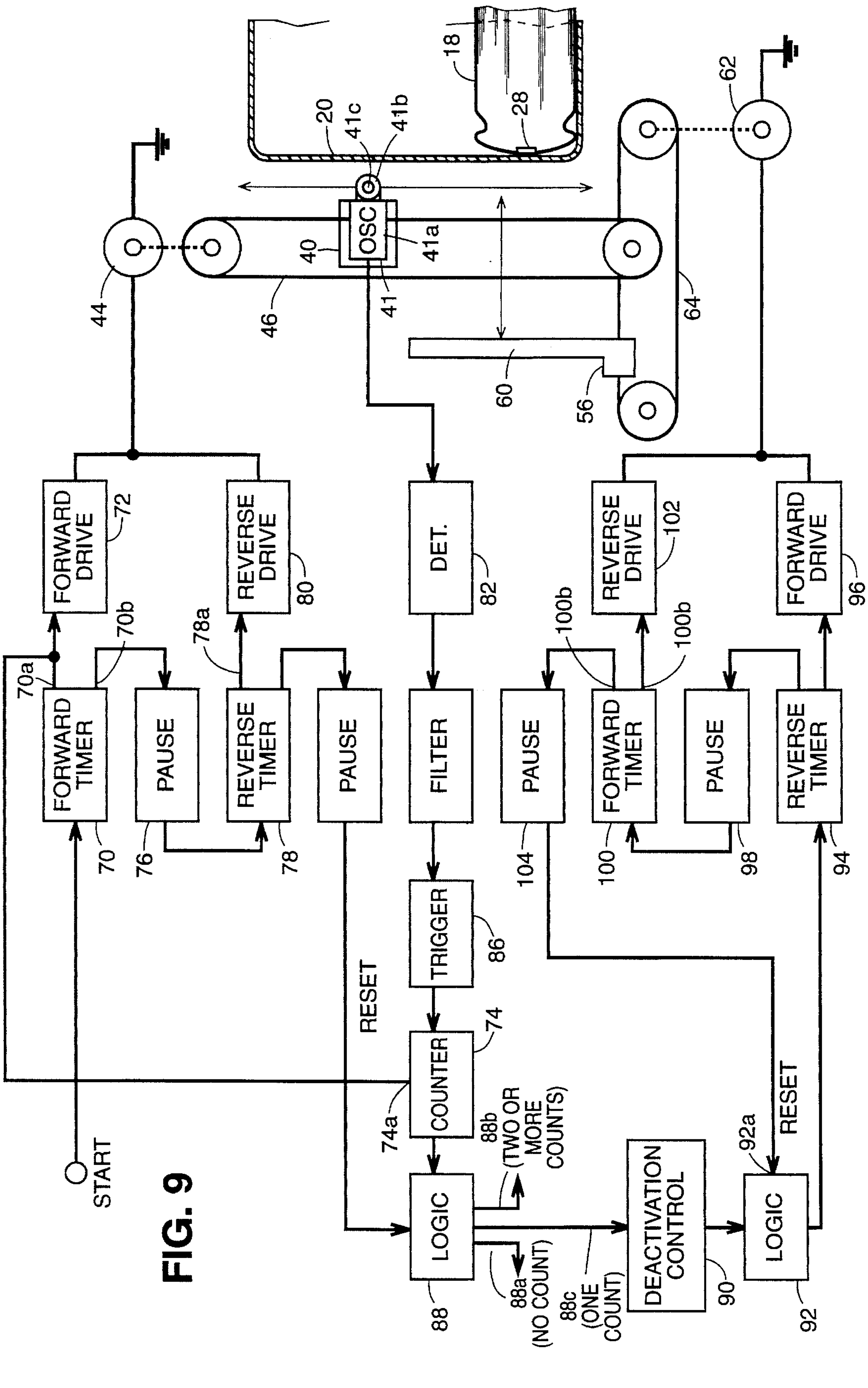
FIG. 9 is a block diagram of a control system which controls the operation of the desensitizer of FIGS. 4–8.
Figure 10:
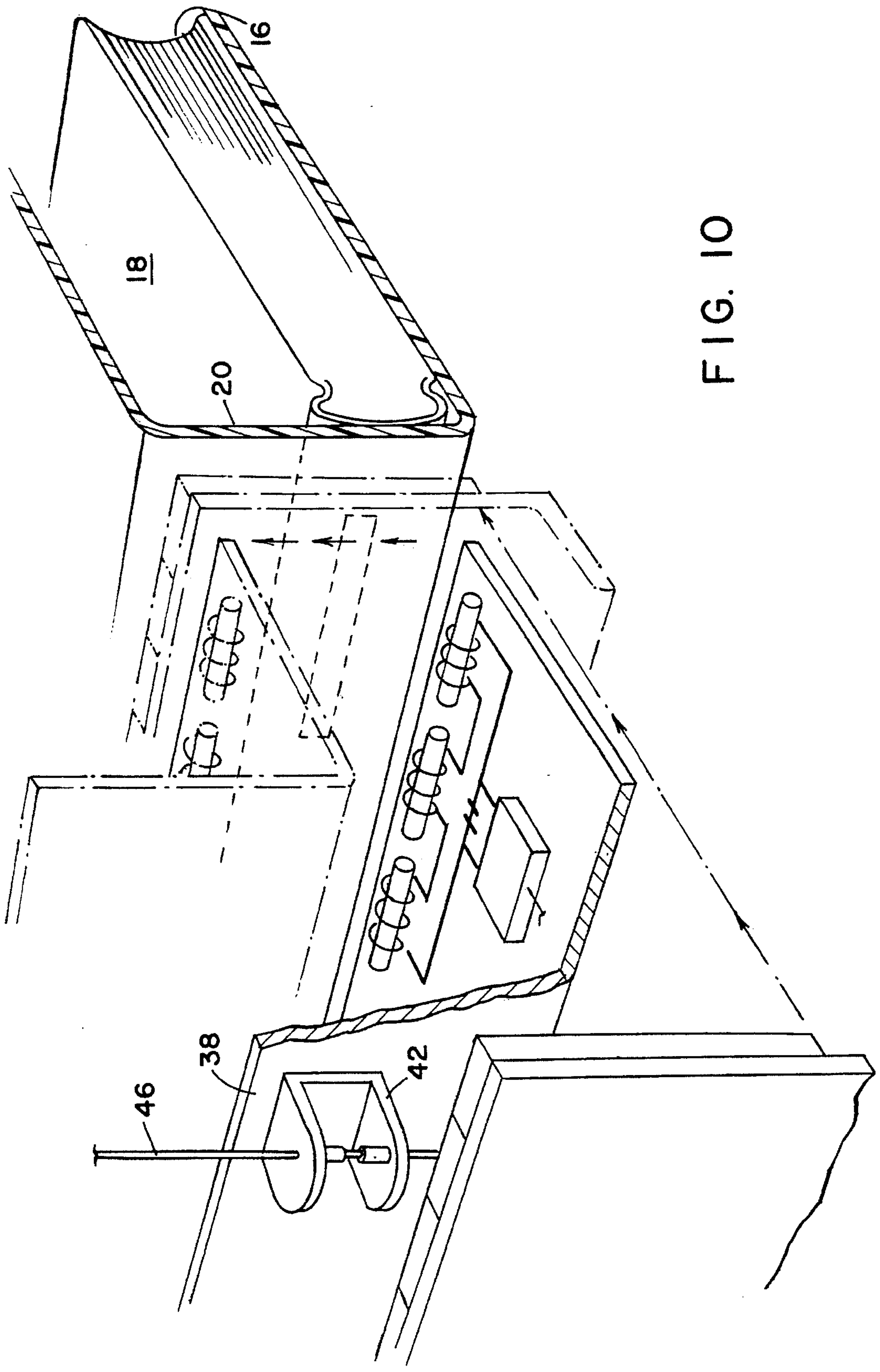

FIG. 9 shows in block diagram form, an arrangement of components that may be used to produce the above described sequence of scanner and desensitizer magnet movements. This particular arrangement is described primarily for ease in understanding the principles of the invention. No particular form or configuration of the elements which produce the functions to be described in connection with FIG. 9 provide any better way of carrying out the invention. Several of the elements or their function can be combined in a single integrated circuit as is well known to those of ordinary skill in integrated circuit design.

As shown in FIG. 9, a start signal which is generated after a book 18 is in position with its spine against the wall 20 of the recess 14, is applied to a forward timer 70. This causes a first output terminal 70*a* of the forward timer to produce a signal while a second output terminal 70*b* produces no signal. The signal from the first terminal 70*a* is applied to a forward drive circuit 72 which in turn causes the scanner drive motor 44 to turn in a forward direction. This in turn causes the drive chain 46 to move the scanner carrier 40 downwardly. During this time, the signal from the first output terminal 70*a* of the forward timer 70 is also applied to a reset terminal 74*a* of a counter 74. This prevents the counter 74 from accumulating any count while the scanner carrier 40 is being driven downwardly.

When the scanner carrier 40 reaches its lowermost position, after about 2.5 seconds, the forward timer 70 reverts to its original state with its first terminal 70*a* producing no signal and its second terminal 70*b* producing a signal. This change of timer condition causes to forward drive circuit 72 to be deenergized so that the motor 44 stops. Also, the signal to the reset terminal 74*a* of the counter 74 is terminated and the counter may now begin to accumulate counts.

The signal from the second output terminal 70*b* of the first timer 70 is applied to a pause timer 76 which delays the signal for about 50 milliseconds. This allows sufficient time for the scanner carrier 40 to come to a complete stop after the motor 44 has been deenergized. After this pause, a signal from the pause timer 76 is applied to a reverse timer 78. This causes a first output terminal 78*a* of the reverse timer to produce a signal which is applied to a reverse drive circuit 80 which causes the scanner drive motor 44 to turn in the reverse direction so that the scanner carrier 40 is driven back upwardly to its original position.

During the upward movement of the scanner carrier 40, the oscillator 41*a* of the scanner operates continuously at about 30 kilohertz at a fixed amplitude. However, as the scanner coil 41*b* passes by the sensor strip 28 in the spine of a book 18, the material of the sensor strip changes the effective inductance of the coil 41*b* and ferrite rod 41*c* of the scanner. This in turn causes a decrease in the oscillation amplitude of the oscillator 41*a* while its coil is passing by the sensor strip 28. A similar amplitude decrease occurs each time the oscillator coil 41*b* passes by and becomes loaded by a sensor strip 28. The oscillation amplitude decreases or dips become detected in a detector 82 and a filter 84. These detected dips in amplitude are applied to a trigger generator 86 which produces corresponding countable pulses. The pulses are then accumulated in the counter 74. As long as there is no reset signal at the reset terminal 74a of the counter 74, its accumulated count is applied to a logic circuit 88 which ascertains whether zero, one, or more than one pulse has occurred during the upward scan of the scanner 41.

If zero or more than one count have been recorded the logic circuit outputs a signal on line 88*a* or line 88*b* to indicate improper operation of the apparatus, for example that no book was detected or that more than one book is present in the apparatus. If the logic circuit 88 ascertains that one and only one pulse has occurred during a scan, it will output a signal on line 88*c*. This signal is applied to a deactivation control 90 to initiate continuation of the automatic book checkout apparatus. In conjunction with this, a signal is applied from the deactivation control 90*a* to a resettable logic circuit 92.

If the logic circuit has been reset by a signal applied to a reset terminal 92*a* thereon, the circuit will apply a signal to a forward timer 94. This causes the time 94 to produce a continuous positive signal at a forward drive output terminal 94*a* and no signal at another output terminal 94*b*. The signal from the terminal 94*a* continues for a period of about 2.5 seconds during which a forward drive circuit 96 is energized to operate the desensitizer drive motor 62 to drive the chain belt 64 so as to move the desensitizer magnets 60 toward the wall 20 and the sensor element 28 in the book 18. When the magnets 60 are brought near to the desensitizer elements 28*a* on the sensor element 28 the cause the elements 28*a* to become magnetized and thereby desensitize the sensor element.

After the motor 62 has been driven in the forward direction for about 2.5 seconds, the timer 94 changes state so that its terminal 94*a* produces no signal and its terminal 94*b* produces a signal. Accordingly the motor 62 ceases to be driven in the forward direction and the desensitizer magnets come to a stop adjacent the wall 20. The output from the timer terminal 94*b* is applied to a pause circuit 98 which delays the signal for about 50 milliseconds to allow sufficient time for the magnets 60 to come to a full stop. Thereafter, a signal from the pause circuit 98 is applied to a reverse timer circuit 100. When this occurs, the circuit 100 produces a positive signal at a first output terminal 100*a* and no signal at another output terminal 100*b*. The signal at the terminal 100*a*, which remains for a period of about 2.5 seconds, energizes a reverse drive circuit 102 which operates the driven chain 64 to drive the deactivation magnets 60 back away from the wall 28 to their original position.

After about 2.5 seconds, the timer 100 reverts to is original state with the first terminal 100a producing no signal and the other terminal 100*b* producing a positive signal. This causes the reverse drive circuit to cease operation so that the motor 62 stops. Also the signal at the timer terminal 100b becomes applied to a pause circuit 104 in which it is delayed for about 50 milliseconds. This allows the motor 62 to come to a complete stop after it has been deenergized. Thereafter the pause circuit 104 supplies a signal to the reset terminal 92*a* of the logic circuit 92 so that a further signal from the deactivation control may now initiate further forward drive of the deactivation motor 62.

It will be appreciated from the foregoing that the apparatus described herein is simple in concept and execution and it does not require apparatus which depends upon books sliding over one another nor does it require measurement and recordal of indicia of the physical characteristics of books such as their weight or thickness.

We claim:

1. Apparatus for desensitizing sensor elements which are mounted on protected articles, said apparatus comprising: a sensor element detector; a scanning mechanism which moves said detector to produce a scan along a surface adjacent to which multiple sensor elements may be placed, the movement of the detector being in a direction such that, during said scan, said detector passes directly over each of said sensor elements in succession and successively detects the presence of each of said sensor elements; a sensor element desensitizing mechanism arranged to be operated to desensitize said sensor elements adjacent said surface; and a control apparatus connected to operate the desensitizing mechanism following a scan in response to the detection of a predetermined number of sensor elements during said scan.

2. Apparatus according to claim 1, wherein said articles are books, each of which has at least one of said sensor elements mounted in the spine thereof and wherein said predetermined number is one.

3. Apparatus according to claim 2, wherein said surface is formed on a vertical wall against one side of which said books may be placed, and along the other side of which said scanner is arranged to scan.

4. Apparatus according to claim 3, wherein said desensitizing mechanism is arranged to move toward and away from said other side of said wall.

5. Apparatus according to claim 3, wherein said scanner comprises a sensor which is responsive to the presence of a sensor element in proximity thereto to produce a detection signal.

6. Apparatus according to claim 5, wherein said scanner comprises an oscillator whose oscillation amplitude is affected by the presence of a sensor element in proximity thereto.

7. Apparatus according to claim 6, wherein said oscillator includes an elongated coil which is maintained parallel to and adjacent said wall, and extends in a direction transverse to the direction of scan, said coil being connected to form a portion of a resonant tank circuit of said oscillator whose resonant frequency corresponds to the inductance of said coil.

8. Apparatus according to claim 7, wherein a ferrite core extends through said coil.

9. Apparatus according to claim 4, wherein said desensitizing mechanism includes magnetizing elements for magnetizing desensitizing elements on a sensor element positioned in proximity thereto.

10. Apparatus according to claim 5, wherein said control apparatus includes a counter for counting detection signals from said scanner during one scan.

11. Apparatus according to claim 6, wherein said control apparatus is operative to count detection signals only during a scan in a single direction.

12. A method of desensitizing sensor elements which are mounted on protected articles, said method comprising the steps of: positioning articles on which sensor elements are mounted such that said sensor elements are arranged along a scanning surface; moving a sensor element detector along said surface to produce a scan such that said detector passes, in succession, directly over each of said sensor elements and successively detects the presence of said sensor elements; and, following such scan, desensitizing said sensor elements in response to detection of a predetermined number of sensor elements during said scan.

13. A method according to claim 12, wherein said articles are books, each of which has one of said sensor elements mounted in the spine thereof and wherein said predetermined number is one.

14. A method according to claim 13, wherein said scanning is carried out along one side of a vertical wall, against the other side of which said books are placed.

15. A method according to claim 14, wherein said desensitizing is carried out by moving a desensitizing mechanism toward and away from said one side of said wall.

16. A method according to claim 14, wherein said sensor element detector produces, during said scanning, a detection signal as said detector moves along said wall and passes by one of said sensor elements.

17. A method according to claim 16, wherein said scanning is carried out by causing an oscillator, whose oscillation amplitude is affected by the presence of one of said sensor elements in proximity thereto, to move along said wall.

18. A method according to claim 17, wherein said desensitizing is carried out by producing magnetic fields of sufficient strength to magnetize desensitizing elements on sensor elements adjacent said wall.

19. A method according to claim 18, wherein detection signals produced by said sensor element detector are counted during a scan in one direction, to ascertain whether one, or more than one, protected article has been positioned against said surface.

20. A method according to claim 19, wherein said desensitizing is carried out only in response to the occurrence of one detection signal during a scan in one direction along said wall.

21. Apparatus according to claim 6, wherein said sensor is a coil whose inductance is changed by relative movement toward and away from a sensor element.

22. A method according to claim 16, wherein the electrical reactance of said sensor element detector is changed by the presence of a sensor element to thereby produce a signal.

* * * * *